Patented Aug. 25, 1942

2,293,861

UNITED STATES PATENT OFFICE 2,293,861

PRODUCTION OF COMPOSITE TITANIUM OXIDE PIGMENTS

Henry Moroni Stark, Wilmington, Del., assignor to E. I. du Pont de Nemours & Company, Wilmington, Del., a corporation of Delaware No Drawing. Application August 14, 1940, Serial No. 352,524

7 Claims. (Cl. 106—300)

This invention relates to the production of improved rutile titanium oxide pigments, and more particularly to a process for preparing a composite pigment substance comprising rutile titanium oxide and barium sulfate.

Titanium oxide occurs in three crystalline states, i: e., anatase, brookite and rutile, having refractive indices, respectively, of 2.52, 2.64 and 2.71. While rutile possesses the highest refractive index and therefore the greatest potential hiding power, commercial titanium oxide pigments are usually characterized by the anatase crystalline structure. Although many processes are already known from which rutile may be obtained, they have not been commercially exploited principally for the reason that relatively pure titanium chloride solutions must be used therein and said processes require the chlorination of titaniferous ores at exceedingly high temperatures. Many difficulties, especially problems of corrosion, are encountered in such processes, to render the same extremely uneconomical and commercially unattractive for the production on a wide scale of rutile titanium oxide pigment.

It is among the objects of the present invention to provide a novel and highly useful method for producing rutile titanium oxide pigments, and especially composite forms thereof containing barium sulfate, without the difficulties which have heretofore attended prior rutile titanium oxide production. A particular object of the invention is to provide a novel process in which rutile titanium oxide is obtained from titanium sulfate solutions which normally produce anatase. Further objects and advantages of the invention will be apparent from the following description of my invention.

These and other objects are attained in this invention which comprises dissolving in relatively strong sulfuric acid, precipitated, relatively pure, iron-free titanic acid obtained from the hydrolysis of a titanium sulfate solution, mixing the resulting pure solution of titanium sulfate with a solution of a barium salt of a monobasic mineral acid, hydrolyzing the resultant titanium salt solution in the presence of a seeding or nucleating agent, and then recovering and calcining the resultant composite precipitate to obtain an improved composite rutile $TiO_2$-$BaSO_4$ pigment.

In practically adapting the invention, a titaniferous material, such as ilmenite ore, is first subjected to sulfuric acid attack. This may be effected in the usual and conventional manner, as for instance, in accordance with the process described in U. S. patent to Blumenfeld 1,504,669. The mass resulting from such acid attack is then dissolved in water or dilute sulfuric acid, and, after suitable purification and clarification treatments, the solution which is recovered is subjected to hydrolysis, and in accordance with, preferably, the methods described in U. S. Reissue Patent 18,854 or 18,790. The precipitated raw pigment hydrate (titanic acid) which results is then carefully washed until rendered substantially completely free of iron or other metallic impurities and the wash water gives no reaction for the iron or other impurity. Such substantially complete impurity removal will be found essential to the procurance of optimum results under the invention. Furthermore, said washing operation must be effected while precautions are taken to prevent divalent iron salts in the mother liquor from converting to the ferric condition. For the purpose, I prefer to conduct said washing under substantial reducing conditions, such as in the presence of small quantities of trivalent titanium salts. After recovery of the iron-free precipitate or acid cake, I then dissolve the same in relatively strong concentrated sulfuric acid of at least 60° Bé. strength, whereby a relatively pure titanium sulfate solution containing $H_2SO_4$ and $TiO_2$ in the molar ratio of 1.0 to 2.0 mols $H_2SO_4$ per mol of $TiO_2$ is provided. If the metatitanic acid contains substantial amounts of water, oleum may be advantageously used in effecting such dissolution; or, if desired, the acid cake, prior to dissolution, may be heated to an extent sufficient to boil off or evaporate water present and to provide a dry cake containing at least 85% $TiO_2$. Alternatively, the metatitanic acid may be treated with 66° acid or oleum to produce a dry sulfated mass. Whatever type of treatment is accorded the hydrolysate, the final, relatively pure sulfate solution should contain, as already stated, $H_2SO_4$ and $TiO_2$ in the molar ratio of substantially 1.0 to 2.0 mols $H_2SO_4$ per mol of $TiO_2$. The resulting pure titanium sulfate solution is then mixed, at either room or elevated temperatures (preferably the latter) with a solution of a relatively pure barium salt of a monobasic mineral acid, particularly barium chloride or nitrate. The amount of barium salt so added or incorporated in the titanium sulfate solution preferably calculates to exactly the equivalent of the $H_2SO_4$ content of said solution. Upon such admixture, barium sulfate is precipitated and a relatively pure solution of titanium tetrachloride or nitrate containing, say, from about 2 to 4 mols of HCl or $HNO_3$ per mol of $TiO_2$ and no sulfuric acid becomes formed. This solution comprising a titanium salt of a monobasic acid containing the precipitated barium sulfate in suspension constitutes the liquor which is desirably subjected to hydrolysis in accordance with the invention to obtain my improved composite rutile pigment. During hydrolysis, the concentration of said liquor is maintained at from substantially 50–120 g. TiO₂ per liter, and, to insure ultimate production of a satisfactory rutile product possessing essential pigment tinting strength, color and fine average particle size characteristics, hydrolysis is initiated and effected in the presence of a small amount, say, from 2 to 5% and preferably about 3%, of a titanium-oxygen compound as a seeding or nucleating agent. Said seeding or accelerating agent is stable and preferably relatively insoluble in the hydrolyzable liquor. It may be conveniently prepared by neutralizing a titanium salt solution, such as the aforesaid titanium sulfate or other solution, by admixing therewith a suitable alkaline agent, such as sodium, potassium or ammonium hydroxide, or an alkali metal or alkaline earth metal carbonate. For example, a sufficient amount of sodium hydroxide may be added to a portion of the titanium liquor containing the barium sulfate suspension and addition thereof continued until a pH of about 6.5 to about 7.0 is reached. The precipitate which is formed is recovered and carefully washed to render the same completely free of sulfate ions or other anions. The purified precipitate is then suitably peptized by adding a monobasic acid such as hydrochloric in sufficient quantities to provide a suspension of about 0.3 normal with respect to HCl and containing about 30 g. TiO₂ per liter. Other useful monobasic acids include nitric, perchloric, chloracetic, hydrobromic, etc. The resultant mixture is then moderately heated to a temperature of about 80° C. and there maintained for about 15–30 minutes. It is then cooled and used directly, or the insoluble seed is separated and washed prior to use. If desired, the TiO₂ content of the said suspension may range from 20–40 g. TiO₂ per liter and the conditioning thereof may be effected at temperatures ranging from substantially 50° C. to 90° C. As indicated, a small amount, preferably about 3% on the TiO₂ basis, of the seed material is then added to the barium sulfate-containing hydrolysis liquor and the resultant mixture is heated at temperatures ranging from about 95–100° C. for a sufficient period, usually 30 minutes, to effect precipitation of the desired rutile TiO₂-BaSO₄ composite raw pigment. This precipitate is thereupon recovered from the hydrolysis mother liquor and after suitable filtering and washing to free it of said mother liquor, is dried and calcined at temperatures ranging from substantially 650–950° C., or as high as 1000° C. in accordance with well-known calcination procedures. As a result, a new and improved type of high purity composite pigment possessing several novel and distinctive properties will be found to result. Its TiO₂ content will be completely in the crystalline structure of rutile and will therefore possess the highest refractive index, it will be high in tinting strength and hiding power, very white in appearance, and will exhibit excellent brightness characteristics. Due to its relatively small and uniform average particle size, it will also exhibit optimum pigment properties, and thus be adapted for many uses; especially in paints and coating compositions employed in both interior and exterior applications.

To a more complete understanding of the invention, the following examples are given, which are merely illustrative and are not to be considered as in limitation of my invention:

*Example I*

Titanium oxide raw pigment was obtained by attacking ilmenite with H₂SO₄ according to U. S. 1,504,669 and hydrolyzing the solution of titanium sulfate according to U. S. Re. 18,854 and washing the precipitate free of iron and other impurities. This purified titanium oxide was dissolved in H₂SO₄ solution. The H₂SO₄ was added as the concentrated acid (95% H₂SO₄) to the wet filter cake containing approximately 35% TiO₂. The amount of acid used to dissolve the TiO₂ was equivalent to 1.8 mols H₂SO₄ per mol TiO₂ which gave a solution containing about 50% H₂SO₄ in contact with the TiO₂ during dissolving. To the solution of titanium sulfate was added a hot solution of barium chloride containing 450 grams BaCl₂.2H₂O per liter and containing barium equivalent to the amount of H₂SO₄. There was immediate reaction to precipitate the BaSO₄ and form a solution of titanium chloride containing 60 grams TiO₂ per liter. Seed for the hydrolysis was prepared by precipitation of orthotitanic acid from a solution of titanium chloride of high purity followed by washing of the precipitate and peptizing by heating in HCl (0.3 normal) at a TiO₂ concentration of 30 grams per liter. This seed was added to the titanium chloride solution containing suspended BaSO₄ to the extent of 3% on the TiO₂ basis and the mixture heated to 95° and held at this temperature for 30 minutes. The TiO₂ precipitated on the BaSO₄ when examined by X-ray technique was found to be wholly in the rutile crystal form. After the usual washing, drying and calcining treatments the product was a white composite pigment containing 15% TiO₂ and 85% BaSO₄ and characterized by high tinting strength and excellent color.

*Example II*

Titanium oxide raw pigment was prepared by hydrolysis of a titanium sulfate solution by known procedures. The hydrolysis precipitate was washed thoroughly to remove iron and other impurities and was then dried at 110° C. The dried raw pigment was pulverized and mixed with strong sulfuric acid (about 85% H₂SO₄ by weight) in the proportion of 1.7 mols of H₂SO₄ per mol of TiO₂ and the resulting paste was heated for a period of four hours at a temperature of 190° C. The spongy mass was dissolved in water to give a solution containing 350 grams of TiO₂ per liter and 728 grams of H₂SO₄ per liter. Aqueous barium nitrate was prepared by mixing barium nitrate crystals with water in the ratio of 348 grams of barium nitrate to 1000 grams of water, and heating to effect solution. The aqueous barium nitrate was added to the titanium sulfate solution in sufficient quantity to react with all of the H₂SO₄ and precipitate the sulfate as BaSO₄. A portion of the suspension was filtered and tested to make sure that all soluble sulfate was precipitated. The resulting titanium nitrate solution containing suspended barium sulfate was hydrolyzed. Seed for the hydrolysis was prepared by neutralizing a portion of the titanium sulfate solution with alkali solution to precipitate orthotitanic acid, washing the precipitate free of sulfate ions, and peptizing by heating for 20 minutes at 80° C. at a concentration of 30 grams of TiO₂ per liter and 0.3 normal with respect to HNO₃. To the titanium nitrate solution containing suspended BaSO₄ was added a portion of the seed equivalent to 3% on the TiO₂ basis. The resulting suspension was heated for 30 minutes at a temperature of 95° to 100° C. to effect hydrolysis. The precipitate was washed and dried. The TiO₂ constituent was rutile by X-ray analysis. On calcination of the washed precipitate a composite pigment of excellent color and high tinting strength was obtained.

*Example III*

Titanium sulfate containing H₂SO₄ and TiO₂ in the molar ratio of approximately 1:1 was prepared by dissolving anatase raw pigment in H₂SO₄ (4 mols H₂SO₄ per mol TiO₂), adjusting the H₂SO₄ content of the solution to about 700 grams per liter, heating the solution to precipitate titanyl sulfate (TiOSO₄.2H₂O), washing the titanyl sulfate crystals with dilute H₂SO₄ and finally with alcohol. The crystals of titanyl sulfate were dissolved in water to give a solution containing 330 grams TiO₂ and 423 grams H₂SO₄ per liter. To 484 cc. of this solution was added 511 grams BaCl₂.2H₂O dissolved in 1000 cc. water. The resulting solution (1880 cc.) containing 85 grams TiO₂ per liter as TiCl₄ was seeded with nuclei prepared by neutralizing a solution of TiCl₄ to pH=6.8, washing the precipitate and peptizing by heating for 20 minutes at 80° C. at a concentration of 30 grams TiO₂ per liter and 0.3 normal with respect to HCl. The amount of nuclei added to the TiCl₄-BaSO₄ was equivalent to 3% on the TiO₂ basis. The seeded solution containing BaSO₄ in suspension was heated to boiling and boiled for 2 hours. The precipitate contained TiO₂ in the rutile crystal form mixed with BaSO₄ in the ratio 25% TiO₂:75% BaSO₄. The product after washing, drying and calcination was a white composite pigment of high tinting strength and excellent color.

As will be apparent, the invention involves the essential steps of producing a relatively pure solution of titanium sulfate from titaniferous materials, the addition of a soluble barium compound of a monobasic acid to such pure titanium sulfate solution to precipitate barium sulfate and form a solution containing titanium combined with the negative radical of the monobasic acid, and the hydrolysis of the titanium salt solution in the presence of suspended BaSO₄, followed by washing, drying and calcining of the resulting composite precipitate. In the prior production of composite TiO₂ pigments, it has been proposed to attack titaniferous material by melting it together with an alkali sulfide or sulfate and carbon, and to then wash the resultant melt and boil the residue in dilute sulfuric acid. Thereafter, said residue is digested in further quantities of sulfuric acid to obtain a titanium sulfate solution, to which a solution of barium chloride is added and the resultant mixture hydrolyzed to precipitate the TiO₂. In such prior methods, however, a relatively impure titanium solution, containing large quantities of objectionable iron compounds must be used and, as a consequence, the finished product contains a substantial amount of this impurity which is distinctly disadvantageous from the standpoint of obtaining pigments of requisite, superior color. Furthermore, the product from such process comprises impure, amorphous titanium oxide, as distinguished from my pigment product, which consists of rutile, the crystalline form of titanium oxide having the highest refractive index. The instant process also affords one in which a relatively pure solution of titanium sulfate is converted into a titanium chloride solution by reaction with a pure barium salt solution. The resulting pure chloride solution is then hydrolyzed in the presence of a nucleating agent which has an advantageous effect and improvement upon both the color and tinting strength of the final composite pigment.

A further advantage which my invention affords lies in the availability of titanium nitrate solutions for use in producing my novel composite pigments. Thus, the provision and use of relatively pure titanium solutions overcomes the difficulties heretofore encountered by reason of the presence of iron contaminants in hydrolysis solutions which, in the presence of the nitrate ion, readily and objectionably convert to the ferric condition to result in an iron-contaminated TiO₂ product which would be extremely light sensitive.

I claim as my invention:

1. A process for producing a composite TiO₂-BaSO₄ pigment of improved tinting strength, color and hiding power and in which the TiO₂ content is in substantially the rutile crystalline state, comprising dissolving, in relatively strong sulfuric acid, precipitated, purified titanic acid obtained from the hydrolysis of a titanium sulfate solution, mixing the pure solution of titanium sulfate which results with a solution of a barium salt of a monobasic mineral acid, incorporating a relatively insoluble titanium-oxygen compound nucleating agent in the resulting mixture, hydrolyzing the barium sulfate-containing titanium solution which results, and then calcining the recovered composite precipitate to develop its pigment properties.

2. A process for producing a composite TiO₂-BaSO₄ pigment of improved tinting strength, color and hiding power and in which the TiO₂ content is in substantially the rutile crystalline state, comprising dissolving, in relatively strong sulfuric acid, precipitated, purified anatase titanium oxide obtained from the hydrolysis of a titanium sulfate solution, mixing the resulting pure solution of titanium sulfate, having an H₂SO₄ and TiO₂ concentration in the molar ratio of substantially 1.0 to 2.0 mols H₂SO₄ per mol TiO₂, with a solution of a barium salt of a monobasic acid, hydrolyzing the resulting barium sulfate-containing titanium solution in the presence of a relatively insoluble titanium-oxygen compound as a nucleating agent, and calcining the recovered composite precipitate to develop its pigment properties.

3. A process for producing a composite TiO₂-BaSO₄ pigment of improved tinting strength, color and hiding power and in which the TiO₂ content is in substantially the rutile crystalline state, comprising dissolving, in concentrated sulfuric acid of at least 60° Bé. strength, precipitated, purified anatase titanium oxide obtained from the hydrolysis of a titanium sulfate solution, mixing the resulting relatively pure solution of titanium sulfate having an H₂SO₄ and TiO₂ concentration in the molar ratio of substantially 1.0 to 2.0 mols H₂SO₄ per mol of TiO₂, with a solution of a barium salt of a monobasic mineral acid, hydrolyzing the resultant barium sulfate-containing titanium solution in the presence of a small amount of an insoluble titanium-oxygen compound nucleating agent, and then calcining the recovered composite precipitate to develop its pigment properties.

4. A process for producing a composite $TiO_2$-$BaSO_4$ pigment of improved tinting strength, color and hiding power and in which the $TiO_2$ content is in substantially the rutile crystalline state, comprising dissolving, in concentrated sulfuric acid of at least 60° Bé. strength, precipitated, purified anatase titanium oxide obtained from the hydrolysis of a titanium sulfate solution, mixing the resulting relatively pure solution of titanium sulfate, having an $H_2SO_4$ and $TiO_2$ concentration in the molar ratio of substantially 1.0 to 2.0 mols $H_2SO_4$ per mol of $TiO_2$, with a solution of barium chloride, the amount of barium used being the equivalent of the $H_2SO_4$ content of said titanium sulfate solution, hydrolyzing the resultant barium sulfate-containing titanium solution, effecting said hydrolysis in the presence of a small amount of an insoluble titanium oxygen compound nucleating agent, and then calcining the recovered composite precipitate to develop its pigment properties.

5. A process for producing a composite $TiO_2$-$BaSO_4$ pigment of improved tinting strength, color and hiding power and in which the $TiO_2$ content is in substantially the rutile crystalline state, comprising dissolving, in concentrated sulfuric acid of at least 60° Bé. strength, precipitated, purified anatase titanium oxide obtained from the hydrolysis of a titanium sulfate solution, mixing the resulting relatively pure solution of titanium sulfate, having an $H_2SO_4$ and $TiO_2$ concentration in the molar ratio of substantially 1.0 to 2.0 mols $H_2SO_4$ per mol of $TiO_2$, with a solution of barium nitrate, hydrolyzing the resultant barium sulfate-containing titanium solution in the presence of a small amount of an insoluble titanium-oxygen compound as a nucleating agent, and then calcining the recovered composite precipitate to develop its pigment properties.

6. A process for producing a composite $TiO_2$-$BaSO_4$ pigment of improved tinting strength, color and hiding power in which the $TiO_2$ content is in substantially the rutile crystalline form, comprising dissolving in relatively concentrated sulfuric acid of at least 60° Bé. strength, precipitated, purified anatase titanium oxide obtained from the hydrolysis of a titanium sulfate solution, mixing the resulting pure solution of titanium sulfate while the $H_2SO_4$ and $TiO_2$ concentration thereof is in a molar ratio of substantially 1.0 to 2.0 mols $H_2SO_4$ per mol of $TiO_2$ with an amount of a barium salt of a monobasic acid calculating to the chemical equivalent of the $H_2SO_4$ content of said sulfate solution, hydrolyzing the resulting barium sulfate-containing liquor having a molar ratio of 2 to 4 mols of monobasic acid per mol of $TiO_2$ in the presence of a small amount of a relatively insoluble titanium-oxygen compound as a nucleating agent, and then calcining the recovered composite precipitate to develop essential pigment properties.

7. A process for producing a composite $TiO_2$-$BaSO_4$ pigment having improved tinting strength, color and hiding power, the $TiO_2$ content of which is in substantially the rutile crystalline state, comprising dissolving precipitated, purified anatase titanium oxide obtained from the hydrolysis of a titanium sulfate solution in concentrated sulfuric acid of at least 60° Bé. strength, mixing the resulting relatively pure solution of titanium sulfate having an $H_2SO_4$ and $TiO_2$ concentration in a molar ratio of substantially 1.0 to 2.0 mols $H_2SO_4$ per mol of $TiO_2$, with an aqueous barium nitrate solution in sufficient quantity to react with all of the $H_2SO_4$ present in said titanium solution and precipitate the sulfate as $BaSO_4$, thereafter hydrolyzing the resulting barium sulfate-containing titanium solution in the presence of a nucleating agent comprising a small amount of a precipitated, insoluble titanium-oxygen compound, and then calcining the washed composite precipitate which is recovered to develop its pigment characteristics.

HENRY MORONI STARK.